United States Patent [19]
Chesterfield

[11] Patent Number: 5,924,638
[45] Date of Patent: Jul. 20, 1999

[54] COUPLING ARRANGEMENTS FOR FISHING REELS

[75] Inventor: Richard Alan Chesterfield, Camborne, United Kingdom

[73] Assignee: British Fly Reels Limited, Falmouth, United Kingdom

[21] Appl. No.: 09/083,810

[22] Filed: May 22, 1998

[30]    Foreign Application Priority Data

Jun. 26, 1997 [GB] United Kingdom ............... 9713576

[51] Int. Cl.$^6$ ................................................. A01K 89/02
[52] U.S. Cl. .................... 242/295; 242/302; 242/294
[58] Field of Search .................... 242/290, 294, 242/295, 297, 300, 302, 303

[56]    References Cited

U.S. PATENT DOCUMENTS

| | | | |
|---|---|---|---|
| 728,717 | 7/1903 | Hunter | 242/302 X |
| 2,130,671 | 9/1938 | Maynes | 242/303 X |
| 4,958,785 | 9/1990 | Aoki | 242/295 |
| 5,575,432 | 11/1996 | Baisch | 242/302 |

FOREIGN PATENT DOCUMENTS

| | | | |
|---|---|---|---|
| 361105 | 11/1931 | United Kingdom | 242/302 |
| 490157 | 8/1938 | United Kingdom . | |
| 2096441 | 10/1982 | United Kingdom . | |
| 2283892 | 5/1995 | United Kingdom . | |
| 9813546 | 9/1998 | United Kingdom . | |

*Primary Examiner*—Donald P. Walsh
*Assistant Examiner*—Emmanuel M. Marcelo
*Attorney, Agent, or Firm*—Hudak & Shunk Co., L.P.A.; Laura F. Shunk

[57]    ABSTRACT

A unidirectional coupling arrangement for sense-selectively coupling the rotation of a fishing reel spool to a braking or drag arrangement. First and second relatively rotatable elements of the coupling arrangement connect by interlocking teeth which on the first element are carried by an axially-deflectable discrete rotor entrained by a surrounding ring. In the coupled sense of rotation a cam engagement between the rotor and surrounding ring keeps the rotor axially against the complementary teeth on the second rotational element. The onset of rotation in the opposite sense creates a cam engagement between the rotor and surrounding ring which slides the rotor axially away from the second element, disengaging the coupling teeth. This avoids the clicking sound associated with conventional sprung pawls in the uncoupled condition.

20 Claims, 5 Drawing Sheets

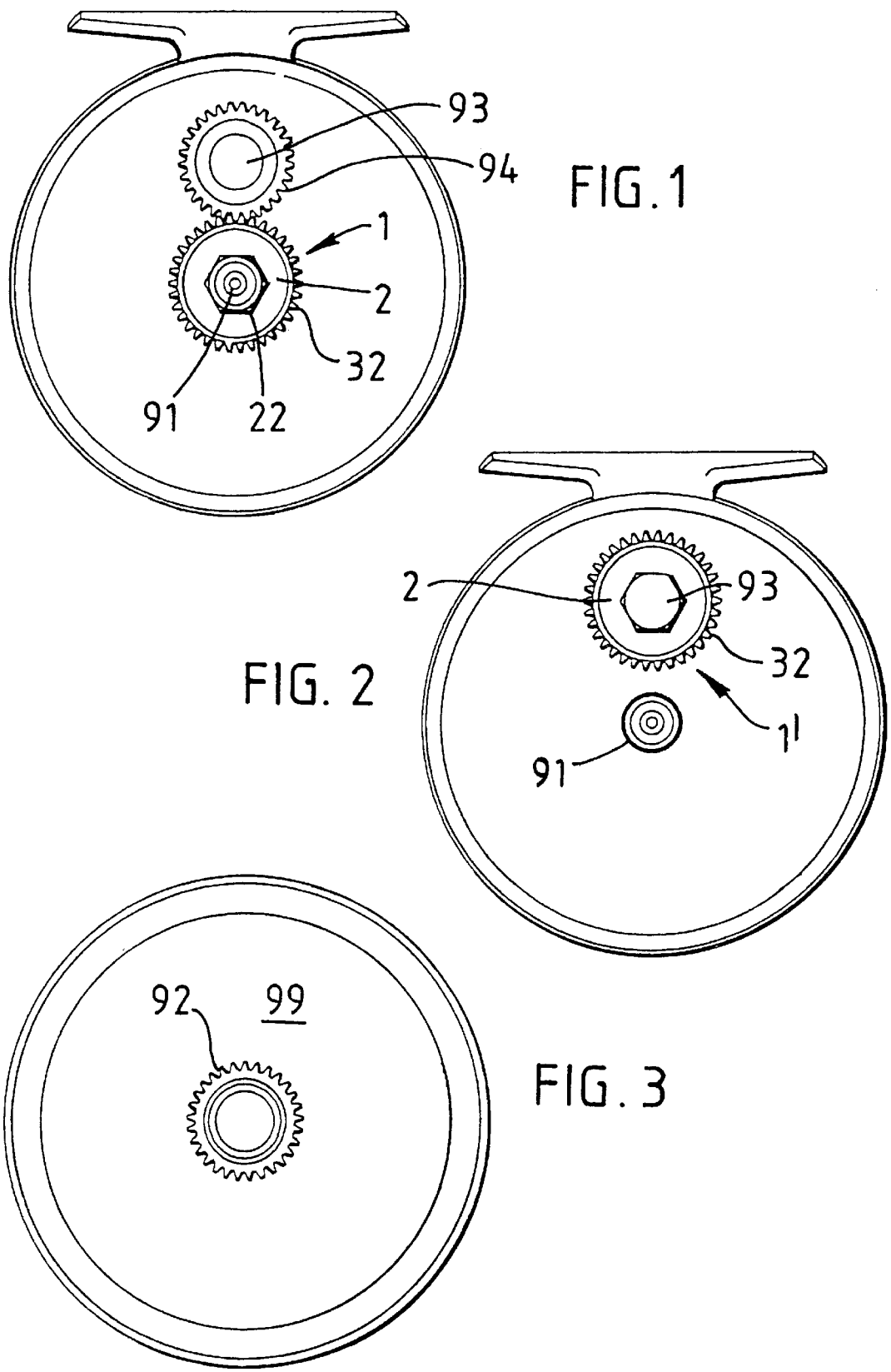

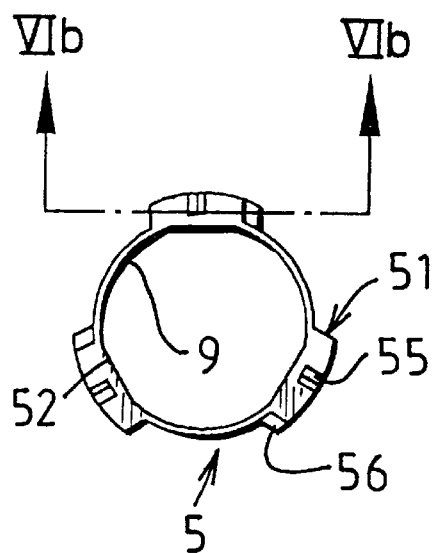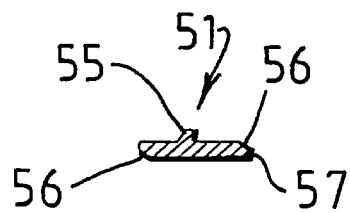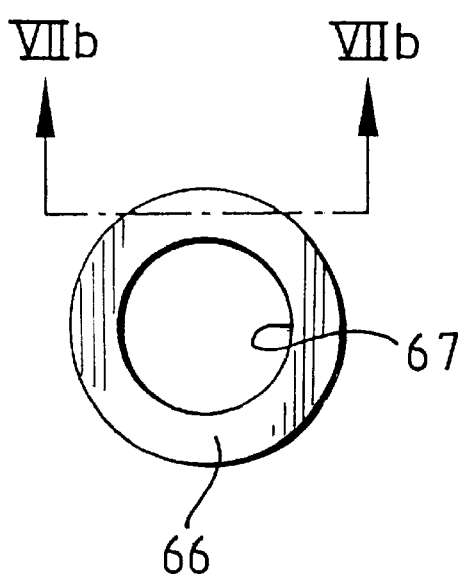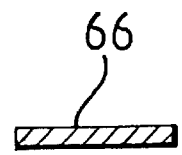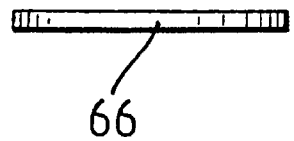

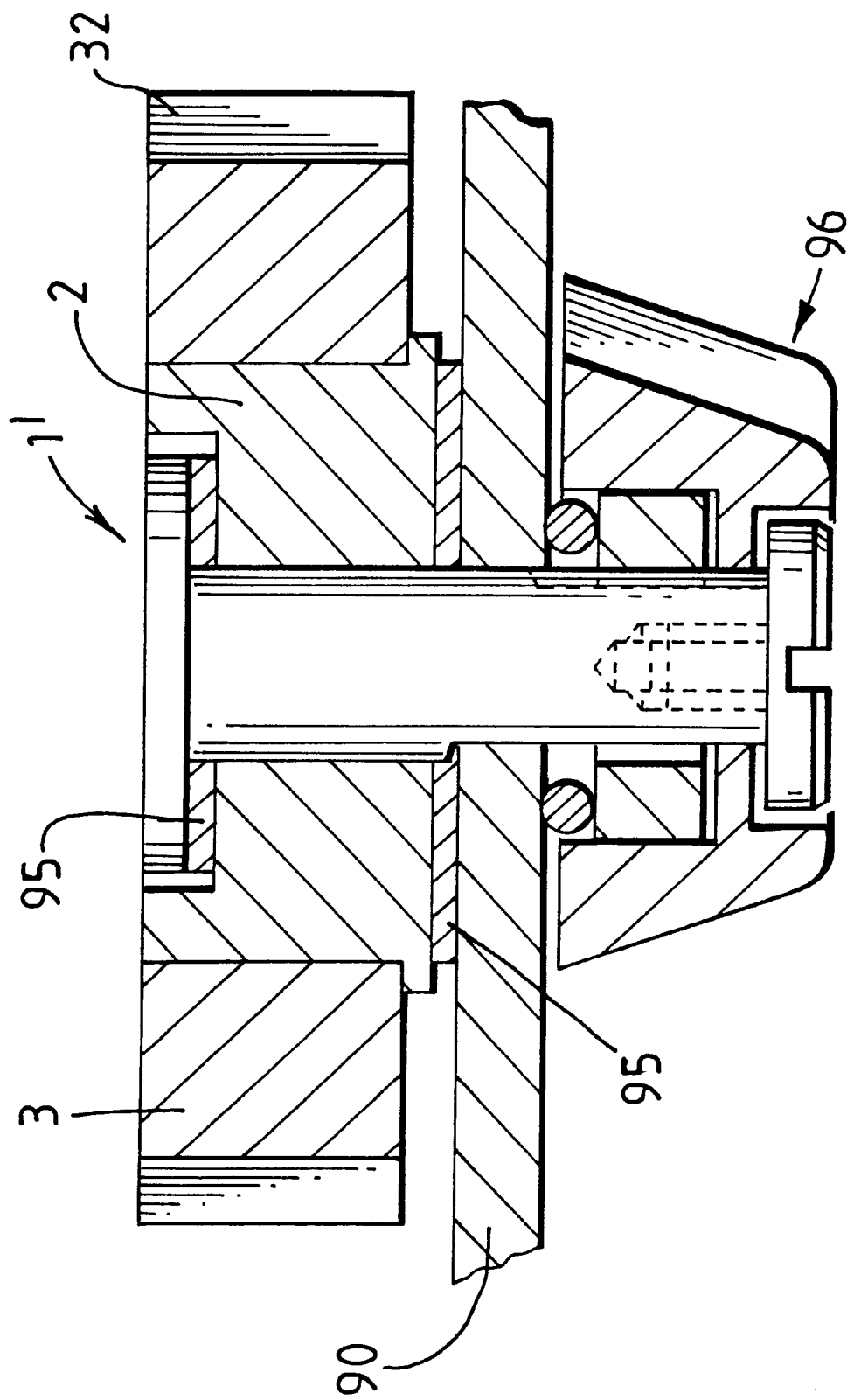

COUPLING ARRANGEMENTS FOR FISHING REELS

FIELD OF THE INVENTION

This invention relates to coupling arrangements for fishing reels, and fishing reels including such arrangements. These are fishing reels of the rotatable-spool type.

BACKGROUND OF THE INVENTION

It is well known to provide some form of unidirectional or sense-selective coupling arrangement between the spool of a reel and associated components. At its simplest this may comprise a click pawl acting against a gear on the spool with more resistance in one direction than the other. More usually there is a spool-braking or drag arrangement, often with an adjustable mechanical brake, which is intended to act on the spool for only one direction of rotation (corresponding to withdrawal of line). The braking arrangement is normally provided between the spool and the reel housing's back plate, eccentrically of the spool axis and acting on a rotatable component e.g. a drum or gear connected to the spool by a unidirectional coupling so that the brake has no effect for the other sense of rotation (winding in).

PRIOR ART

A wide variety of arrangements have been proposed. GB2096441 describes housing the unidirectional coupling and braking arrangement in a discrete cassette within the reel back plate, the cassette being fittable in the back plate either way up to be usable by right- and left-handed anglers. GB2283892 describes a simpler invertible arrangement in the form of a one-piece plastic disc having projecting resilient pawls on its two axial faces which interact respectively with circumferential sets of teeth on the surface of the backplate and the rear face of the spool. The disc is acted on directly by the brake, or is geared to rotate a separate gear acted on by the brake.

In U.S. Pat. No. 4,168,041 (Abu) a brake coupling disc, acted on unidirectionally by a sprung pawl clutch ring rotating with the spool, has a sliding face plate which for winding-in rotation is entrained by the pawl clutch ring and holds the pawls out of the corresponding ratchet recesses in the coupling disc to prevent clicking.

SUMMARY OF THE INVENTION

An object of the invention is to provide new rotational coupling arrangements for fishing reels which enable click-free operation when desired, easy construction and the possibility of switching between left- and right-handed use modes by a simple inversion.

Another object herein is to provide a rotational coupling arrangement for a fishing reel which can be made as a self-contained module entirely from plastics material, without requiring spring members for pawl operation.

A first aspect relates to a rotational coupling arrangement for a fishing reel comprising first and second coaxial rotational elements having respectively first and second coupling portions which interact to provide unidirectional coupling between the elements, whereby rotation of one of the elements drives direct co-rotation of the other for a first sense of rotation (coupled condition) but not for the opposite, second sense of rotation (uncoupled condition). Our first proposal exploits a relative axial coupling/uncoupling movement between the coupling portions. The first coupling portion is or has at least one axially-deflectable component for making rotational coupling engagement with the second coupling portion.

In a first aspect we propose that the axially-deflectable component makes a coupling cam engagement with a co-operating coupling cam structure on an adjacent relatively-rotatable part of the first rotational element. At the onset of spool rotation in the first sense, the coupling cam parts on the axially-deflectable component and the adjacent relatively rotatable component make a sliding cam engagement which cams the axially-deflectable component into coupling engagement with the second coupling portion, providing the coupled condition.

When rotation in the second sense begins, the axially-deflectable component needs to move relative to the second coupling portion into the uncoupled condition, and remain that way. In particular, the arrangement will generally comprise detent means for maintaining the axially-deflectable component in the disengaged position as rotation in the second sense proceeds. Preferred constructions of the detent means are discussed below.

The preferred means for moving the axially-deflectable component from the engaged to the disengaged position are in accordance with the further aspect set out as follows.

In the further aspect the first rotational element, preferably the coupling portion thereof, makes an uncoupling cam engagement with an adjacent relatively rotatable camming part of the coupling arrangement. Rotation in said second sense between the first and second elements causes or provides this relative camming rotation whereupon the cam engagement acts to move and/or hold the axially-deflectable component axially out of engagement with the second coupling portion as rotation proceeds, providing the uncoupled condition.

We particularly prefer that one or more such engagement be made between the axially-deflectable component of the first rotational element and an adjacent portion of the first rotational element relative to which the axially-deflectable component can rotate for camming, preferably as a discrete part or possibly by relative circumferential flexing. This avoids the need for a continuing relative camming rotation over the cam portion as rotation between the first and second elements continues, which may cause friction if for example the cam engagement is with part of the second rotational element.

Additionally or alternatively a cam engagement to cause initial uncoupling axial deflection at the onset of rotation in the second sense may be made directly with the second element, e.g. by the rotational coupling interlock parts themselves. This can be as with a pawl, except that the uncoupling cam action of the pawl-type engagement may move the deflectable component bodily rather than with internal resilient movement, and/or a further cam or holding engagement of the component then holds it out of coupling engagement e.g. as proposed above.

Conventional unidirectional rotational couplings rely on springing of directional coupling components such as pawls. We prefer that the axially-deflectable component is substantially freely axially translatable or slidable in and out of coupling engagement. This reduces or eliminates the axial urge required to keep it out of coupling engagement.

Each cam engagement may be provided at respective generally circumferentially-directed engagement regions of the deflectable component and the adjacent relatively rotatable part. One or both of these engagement regions can include a cam surface axially inclined in the appropriate direction relative to the radial plane. Where the adjacent relatively rotatable part is part of the first element, as is preferred, its engagement regions may include a circumferentially-directed driving portion or other suitable stop surface adjacent the inclined sliding cam surface, preferably perpendicular to the radial plane, for pushing the deflectable component around for continued rotation after the cam-driven axial coupling/uncoupling movement, without axial camming action thereby reducing stress and friction.

The deflectable component may have at least one and preferably plural radial members providing circumferentially-directed engagement regions for making cam engagement. In particular it may take the form of a discrete rotor with plural radially-extending limbs or spokes. These may engage cam-wise with corresponding surfaces of an annulus of the first element. The annulus can be an entrainment ring which overlaps or surrounds the rotor's radial members to force co-rotation by meshing, but with circumferential lost motion or play between them to provide a relative rotation which is used for the cam action. The rotor and its radial members are preferably substantially axially rigid in operation, e.g. in one piece, the rotor being bodily axially displaceable under the cam action, and preferably without any separate spring being provided as already mentioned.

Preferably the camming portion(s) of the axially-deflectable component is/are in both the coupled and uncoupled conditions meshed with, i.e. circumferentially trapped by, cooperating portions of the relatively rotatable part of the first element.

The coupling engagement itself may be by means of one or plural (preferably more than two) circumferentially distributed interlocking or toothed engagements between the first and second coupling portions. The engagement teeth, projections or other interlock formations are desirably presented on axial faces of the elements; this feature, together with the axial coupling/uncoupling action, can reduce radial stresses which may occur with peripheral teeth (although in principle these may be used) and which also occur with known radially-acting sprung pawls. The axially-deflectable component can have one or more teeth or interlock portions (e.g. recesses) distributed around it e.g. as teeth projecting from radial members of a rotor as mentioned above.

The second coupling portion on the second element can be a circumferential series of axially-directed teeth or interlock portions (recesses) to complement those on the axially-deflectable component.

In a preferred arrangement the first element includes an annulus e.g. entrainment ring and discrete rotor as described above, the radial members of the rotor having axially-directed teeth or interlock recesses and the second element providing a circumferential series of corresponding teeth or recesses over which the rotor limbs rotate when uncoupled. The second element preferably also serves to retain the rotor within the first element's entrainment ring. It may define an axis location or axle for journalling the rotor e.g. a hub portion cooperating axially slidably with an axis portion of the rotor.

In a separate aspect of our proposals, independent of the above but combinable with it, we propose a rotational coupling for a fishing reel having first and second coaxial rotational elements with respective first and second coupling portions which interact to form a unidirectional coupling in which the first coupling portion includes a unidirectional coupling component which is axially movable relative to the second element into and out of coupling engagement, and the arrangement being in the form of a self-contained module in which the first and second elements are held together radially and axially so as to contain the axially-movable component. In particular the second element may comprise portions on either axial side of the axially-movable component, while the first element includes an entrainment ring portion co-rotational with the axially-movable component and which may be trapped between the axially-spaced portions of the second element.

As related to the rotor construction described above, the second element may include an annulus with interlock portions for coupling engagement with the rotor, a central portion which may be a hub portion extending through the rotor and a cover portion on the other axial side of the rotor to retain it. It may take the form of a bobbin. Radially-inward portions of an entrainment ring of the first element, e.g. portions overlapping the rotor limbs to provide cam engagements and co-rotational driving with the rotor, may be trapped between these parts of the second element and are preferably axially located and/or journalled thereby.

In any of the above aspects, each of the first and second elements will generally have an external connection portion to constrain it rotationally with respect to an adjacent component of the reel, such as a spool or brake mechanism hub, axle or axis arranged coaxially with the coupling arrangement, or a rotational element such as the spool or braked gear on a spaced parallel axis. Coaxial connection may be for example by any suitable non-circular keying conformation of the periphery or a central opening, while connection to an external gear may be by a toothed periphery. In particular we prefer the toothed periphery for an entrainment ring as mentioned above, and an axial keying opening for the centre of the second element e.g. a hub portion thereof.

As will be understood from the above the present coupling arrangement may be installed in the reel either coaxially with the spool, in which case it may be acted on directly by a braking arrangement or geared to a braked wheel, or coaxially with a braking arrangement off the spool axis. One of the first and second elements is connected to be driven by the spool rotation, the other is acted on by the brake.

With this construction it is also simple to arrange that the components be removable from the reel, inverted and reinserted for opposite-handed operation. In particular the integrated modular construction referred to above is suitable for this.

Embodiments of the invention are now described in detail with reference to the accompanying drawings.

BRIEF DESCRIPTION OF THE DRAWINGS

In the drawings:

FIGS. 1 and 2 are face views of a reel backplate, showing alternative dispositions for a unidirectional coupling arrangement;

FIG. 3 shows a spool for the FIG. 2 disposition;

FIGS. 4 to 7 show the components of a unidirectional coupling arrangement, respectively an outer gearing, a hub component, a coupling rotor and a cover flange, views (a) in these figures being axial plans, views (b) being chordal sections at the positions indicated and views (c) in FIGS. 5 to 7 being side views;

FIG. 12 is an axial section showing how the coupling can be mounted coaxially with a drag or brake mechanism.

DESCRIPTION OF PREFERRED EMBODIMENTS

Figure 4A:
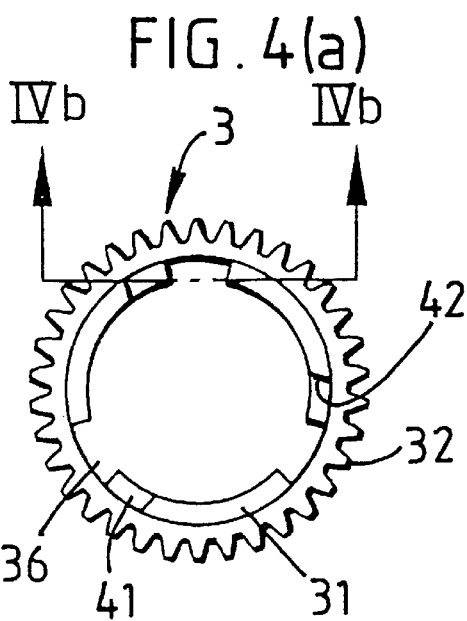
Figure 4B:
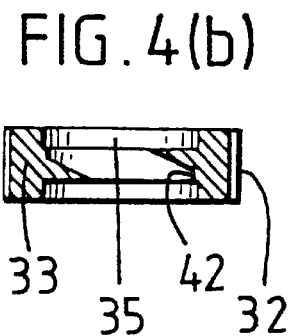
Figure 5A:
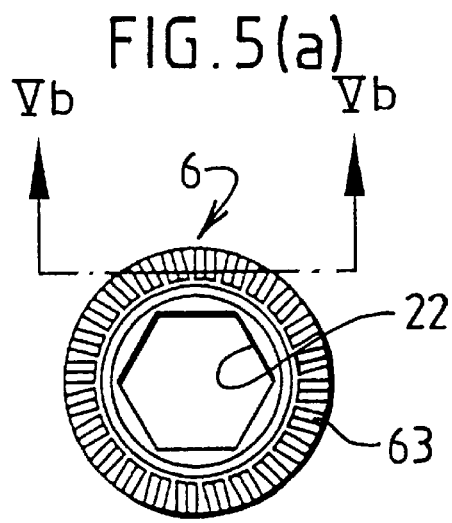
Figure 5B:
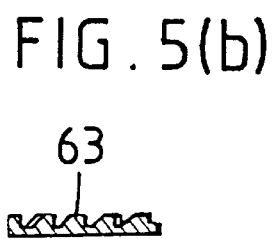
Figure 5C:
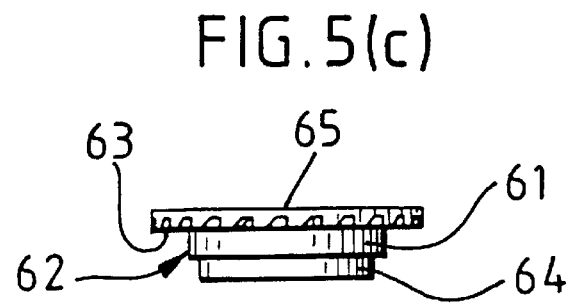

The detailed internal construction of the coupling arrangement is described later, but firstly note that it is generally in annular form with a geared periphery 32 on one of the components and a polygonal axial aperture 22 on the other designed to a fit a corresponding polygonal connector on an adjacent component. FIGS. 1 to 3 illustrate possible dispositions of the device in a reel having a backplate 90, a central spool axis 91 and an offset rotational drag or brake assembly 93. In the FIG. 1 arrangement the coupling device 1 is coaxial with the spool axis 91 and its polygonal aperture 22 constrained to rotate with the spool by engagement with the complementary spool axis 91. The geared periphery 32 of the coupling device meshes with the geared periphery 94 of the drag assembly 93. The inner device component 2 rotates with the spool regardless of direction, but the unidirectional action forces rotation of the outer component's geared periphery 32 only for one sense of rotation (the unwinding sense) to subject the spool rotation to the action of the brake 93.

The alternative FIGS. 2, 3 arrangement provides the unidirectional coupling 1' coaxially with the drag assembly 93 (as also seen in FIG. 12). The spool 99 carries an axial gear 92 (FIG. 3) which meshes with the outer teeth 32 of the unidirectional coupling, while the inner component 2 of the coupling is subjected to the brake mechanism e.g. as in FIG. 12, which shows the inner component 2 sandwiched between friction pads 95 whose pressure is adjustable by a drag control 96. In this arrangement the outer component 3 of the coupling always rotates irrespective of spool rotation sense, but because of the unidirectional coupling the inner component 2, subject to the braking action, is rotated only for the selected one of those senses.

It will be appreciated that the conformation of the coupling and its external connections (the polygonal aperture and toothed periphery) are axially reversible so that it can be installed either way up in either of the illustrated dispositions, for left or right-handed use.

The coupling itself is now described in detail with reference to FIGS. 4 to 11. In the present embodiment all the components are moulded in conventional engineering plastics material, to which the proposed construction lends itself, but other materials may be used.

The construction consists of an outer component 3 having the form of an annulus with external gear teeth 32 and a radially-inwardly directed flange 31 at an axially median level of the outer annulus 33, providing stepped circular bearing areas on the inside of the annulus 33 above and below the flange 31. The flange 31 is interrupted by circumferentially spaced gaps 36—three in this embodiment—best seen in FIG. 4(a). The flange end surfaces directed circumferentially onto these gaps 36 form cams whose function is described later. As to structure, each flange end provides a cam surface 41 extending from one axial face of the flange to an intermediate level thereof, and inclined non-perpendicularly to the radial plane, and a driving or stop surface 42 extending from the cam to the other axial face of the flange and which is perpendicular to the radial plane i.e. axial. Pairs of flange end surfaces 41,42 are oppositely arranged at opposite sides of each gap 36 i.e. an upwardly inclined cam 41 at the lower side of the web on one side of the gap, and a downwardly inclined cam at the upper side of the web on the other side of the gap.

The ring 3 is mounted to rotate, together with the rotor 5 seen in FIG. 6, on a bobbin construction comprising a hub with two end flanges to hold the ring and rotor in place. In the present embodiment this bobbin construction is provided by a one-piece hub base 6 shown in FIG. 5, comprising a central hub projection 61 and an end flange 65, and a separate end flange 66 seen in FIG. 7 which fits to the hub 61 to complete the bobbin and trap the ring 3 and rotor 5 as seen in FIGS. 8 to 11.

The hub base component 6 more particularly includes a central boss having the polygonal centre opening 22 and a smooth cylindrical outer surface 62 for journalling rotation of the rotor 5. Its circular base flange 65 presents an axially-facing annular series of radially-extending teeth 63 which in this embodiment are directional pawls i.e they have a sloped disengagement cam surface to one side and a drive surface on the other side. The central boss also provides a top plug 64 which fits into the central circular opening 67 of the separate flange 66 for the two to be fixed together permanently (e.g. by snap fitting, heat sealing, adhesive or any other suitable means) in the assembled coupling as seen in FIGS. 8 to 11.

In the embodiment shown the discrete flange 66 is plain and the hub flange toothed, but this arrangement could be reversed; a separate flange is needed only so that the other components can be fitted onto the bobbin and not for any subsequent functional reason.

FIG. 6 shows the coupling rotor 5 comprising a thin continuous ring 9 with circumferentially spaced coupling lugs 51, corresponding in disposition to the gaps 36 in the ring 3, distributed around it and projecting radially outwardly. It is formed as a one-piece plastic moulding in this embodiment. The ring 9 runs on the cylindrical surface 62 of the hub 61. Rotary and axial friction between them are minimised by reducing the contact area. This can be by providing localised projections on one of the journal surfaces, e.g. flats 52 interrupting the cylindrical bore surface of the ring 9 as shown in FIG. 6.

One axially directed face of each of the projecting lugs 51 carries an axial coupling tooth 55, and as with the teeth 63 of the bobbin flange these are directional, with inclined disengagement cam surfaces on one side and drive surfaces on the other side.

The circumferential edges of the lugs 51 are formed with cam surfaces 56 across part of their thickness, inclined to the radial plane, and axial drive surfaces 57 across the remaining portion of thickness: see FIG. 6(b).

In the assembled coupling, as seen in FIGS. 8 to 11, it will be seen that the axial thickness of the rotor 5 is less than the axial depth of the hub 61 so that it can slide axially up and down the hub, subject to certain constraints from the cammed end surfaces of the ring flange 31 which closely flank each of the rotor lugs 51. The end flanges 65,66 of the bobbin construction sit in the circular bearing recesses 35 of the annulus 3 for free sliding rotation relative to the annulus while maintaining good axial and radial alignment of the bobbin and ring components.

Figure 8:
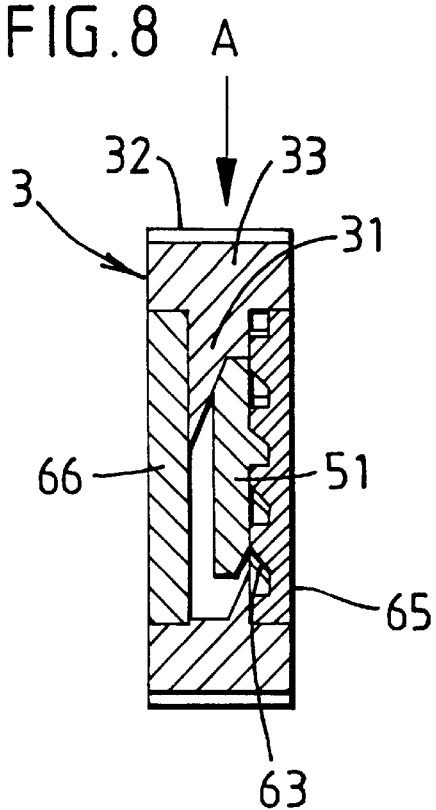
FIGS. 8 to 11 are chordal sections on the assembled coupling at section lines corresponding to those in FIGS. 4 to 7, showing the assembled coupling respectively in a coupled condition, at the onset of uncoupling, in an uncoupled condition and at the onset of re-coupling.

The coupling action is now described with reference to FIGS. 8 to 11 which are chordal sections through the position of one of the rotor lugs 51. FIG. 8 shows a coupled condition, with the periphery of the ring 3 moving in the direction of arrow A relative to the periphery of the bobbin flange 65. The tooth 55 on the rotor lug 51 engages between the teeth 63 of the bobbin flange 65, as do corresponding teeth 55 on the other rotor lugs 51. The rotor is held in this engaged condition against the bobbin flange 65 by the action of the coupling cam surface 41, at the end of the flange gap 36, against the corresponding cam portion 56 at the edge of the lug 51. Jamming is prevented by the complementary engagement of the axial, non-camming stop surfaces 42,57 of the flange 31 and lug 51 respectively which prevent the cams from pressing the rotor against the bobbin flange. The perpendicular drive surfaces of the teeth engage one another for positive, stable driving without the flange 65 and lug 51 being urged together or apart.

Figure 9:
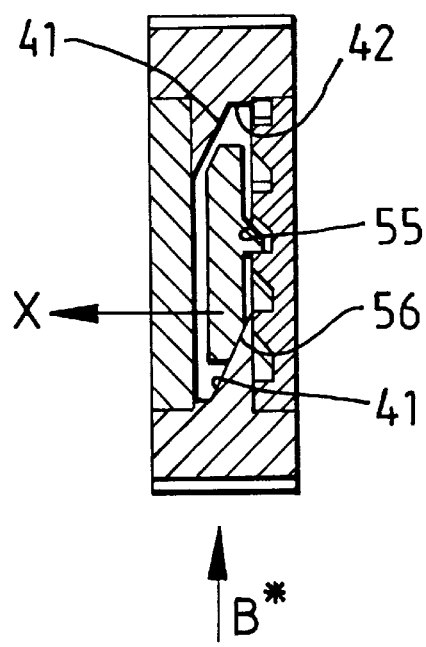

FIG. 9 shows events as the direction of rotation is reversed, the periphery of the ring starting to move in the direction of arrow B* relative to the bobbin flange periphery. The lug 51 remains momentarily stationary under friction with the hub as the play (lost motion) in the flange gap 36 is taken up. Then the cam surface 56 at its opposite edge meets the uncoupling counter-cam surface 41 at the other end of the flange gap 36 which urges it axially in the direction of arrow X and out of engagement with the teeth of the flange 65 as the rotation gets under way. This disengagement is facilitated by the inclined cam surfaces on the rear sides of the teeth, which help the lug and flange to ride clear of one another, and which in an alternative embodiment could perform that function alone.

Figure 10:
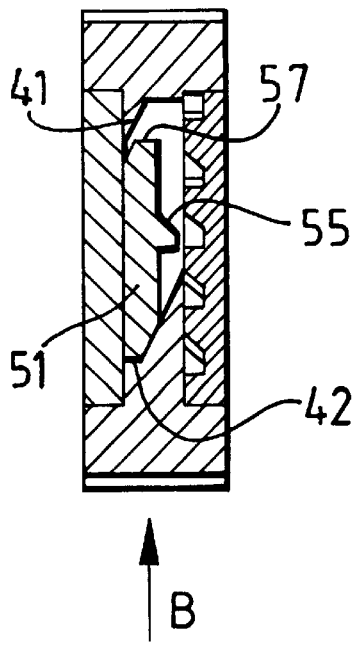

After a small angle of relative rotation the coupling reaches the stable uncoupled condition shown in FIG. 10, the ring periphery rotating continuously in the relative direction of arrow B and the lug 51 continuously out of engagement with the tooth flange 65, resting against the opposite plain flange 66. As in the coupled condition, the complementary shaping of cam and perpendicular stop surfaces 41,42 at the other end of the flange gap 36 with the corresponding surfaces 56,57 on the edge of the lug 51 keep the lug 51 away from the flange 65 without however pressing it against the opposite flange 66, which would increase friction.

Thus, the interaction of the later-described cams enables the complete disengagement of the teeth to occur automatically on reversal of the rotation direction, avoiding the clicking conventionally associated with uncoupled pawls riding over one another. Conversely the action of the first-described cams maintains stable coupling without a spring.

Figure 11:
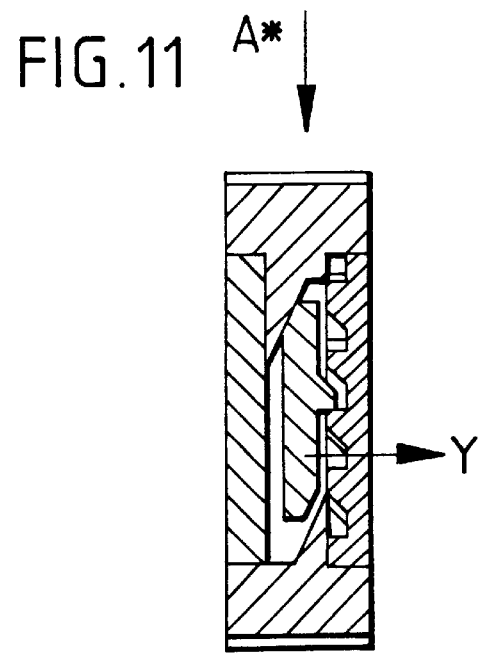

FIG. 11 shows the transition back to the coupled condition, with the onset of rotation in the direction of arrow A* and the cams at the upper end of the figure acting to move the lug 51 axially in the direction of arrow Y and back into coupled engagement.

It should be noted that the described arrangement of cams is but one of a number of possibilities. The skilled person will be able to conceive variations. For example an initial axial movement may be adequately driven by cammed surfaces on the teeth themselves, the cam surface on the adjacent flange end then needing only to be adequate to hold the lug out of engagement; it might be more by way of a ledge, shelf or shoulder or other suitable detent formation. The camming effect furthermore does not necessarily require that both engaged surfaces be shaped as cams. In the present embodiment the complementary shaping of cam and non-cam surfaces is particularly to prevent the rotor from being pressed with undesired friction against the bobbin end flanges, but other conformations may be used to achieve this effect if desired.

A skilled person will also appreciate that, while the avoidance of the need for a spring is an advantage of the arrangement shown, a spring could be used to urge either coupling or uncoupling movement provided that the cam action for the opposing movement combined with the friction of rotation is sufficient to overcome it. Equally, while the rotor is here provided as a component separate from the outer ring it will also be possible to provide the engaging lugs on deflectable arms of a single component although stable movement may be more difficult to achieve.

I claim:

1. A fishing reel having
    a spool rotatable in first and second opposite senses;
    a braking arrangement for braking the rotation of the spool in the first sense of rotation thereof, and
    a unidirectional coupling arrangement connected between the spool and braking arrangement;
    said coupling arrangement comprising a first rotational element having a first coupling portion and first external connector means for coupling to one of said spool and said braking arrangement, and a second rotational element having a second coupling portion and second external connector means for coupling to the other of said spool and said braking arrangement, the first and second rotational elements being coaxial and their respective coupling portions being movable relative to one another between a first, coupled condition in which for said first sense of spool rotation the first and second coupling portions engage one another to rotate together and couple the rotating spool to the braking arrangement, and a second, uncoupled condition in which for the second sense of spool rotation the first and second coupling portions are relatively rotatable to uncouple the spool rotation from the braking arrangement;
    the first coupling portion having at least one axially-deflectable component which is axially deflectable between positions of engagement with and disengagement from the second coupling portion for said coupled and uncoupled conditions respectively,
    the axially-deflectable component having at least one first coupling cam part, and the first rotational element comprising coupling cam structure adjacent said axially-deflectable component, said coupling cam structure having at least one second coupling cam part and being rotatable relative to the axially-deflectable component;
    said first and second coupling cam parts being arranged to cooperate in sliding engagement with one another to cam the axially-deflectable component axially into coupling engagement with the second coupling portion when the axially-deflectable component rotates relative to said adjacent coupling cam structure at the onset of spool rotation in said first sense;
    the coupling arrangement further comprising detent means for maintaining the axially-deflectable component in said position of disengagement from the second coupling portion during rotation in said second sense to provide said second, uncoupled condition.

2. A fishing reel as claimed in claim 1 in which the axially-deflectable component has at least one first uncoupling cam part and the coupling arrangement provides uncoupling cam structure adjacent the axially-deflectable component, the uncoupling cam structure having at least one second uncoupling cam part and being rotatable relative to the axially-deflectable component;
    said first and second uncoupling cam parts being arranged to cooperate in sliding engagement with one another to cam the axially-deflectable component axially out of coupling engagement with the second coupling portion when the axially-deflectable component rotates relative to said adjacent uncoupling cam structure at the onset of spool rotation in said second sense.

3. A fishing reel as claimed in claim 2 in which said uncoupling cam structure is comprised of said first rotational element.

4. A fishing reel as claimed in claim 1 in which the axially-deflectable component is a discrete part of the first rotational element, connected to co-rotate with lost motion relative to said coupling cam structure of the first rotational element to provide said relative rotation for said camming.

5. A fishing reel as claimed in claim 4 in which the axially-deflectable component has the form of a rotor comprising plural circumferentially-spaced radial members, said radial members having respective said coupling cam parts circumferentially directed thereon.

6. A fishing reel as claimed in claim 5 in which the first rotational element comprises an entrainment ring, the entrainment ring having cooperating portions which mesh with the radial members of the axially-deflectable component to force the co-rotation, but with circumferential play to provide the lost motion, said coupling cam structure being provided on said cooperating portions of the entrainment ring.

7. A fishing reel as claimed in claim 6 in which the axially-deflectable component has at least one first uncoupling cam part and the coupling arrangement provides uncoupling cam structure adjacent the axially-deflectable component, the uncoupling cam structure having at least one second uncoupling cam part which is rotatable relative to the axially-deflectable component, said first and second uncoupling cam parts being arranged to cooperate in sliding engagement with one another to cam the axially-deflectable component axially out of coupling engagement with the second coupling portion when the axially-deflectable component rotates relative to said adjacent uncoupling cam structure at the onset of spool rotation in said second sense.

8. A fishing reel as claimed in claim 7 in which said uncoupling cam structure is provided on said cooperating portions of the entrainment ring, with the second uncoupling cam parts thereof circumferentially directed oppositely to the second coupling cam parts thereof, and respective said first uncoupling cam parts are provided on respective ones of the radial members of the axially-deflectable component, directed circumferentially oppositely to the first coupling cam parts thereof, whereby said uncoupling cam parts provide said detent means for maintaining the axially deflectable component in said position of disengagement from the second coupling portion in said second, uncoupled position.

9. A fishing reel as claimed in claim 8 in which at least one of said first and second uncoupling cam parts comprises an inclined sliding cam surface terminating at a stop surface to terminate axial urge on the axially-deflectable component on reaching said position of disengagement.

10. A fishing reel as claimed in claim 6 in which the axially-deflectable component is journalled in the coupling arrangement at a central hub engagement at which it is axially bodily slidable.

11. A fishing reel as claimed in claim 5 in which the radial members of the axially-deflectable component comprise respective coupling interlock formations for making the coupling engagement with complementary coupling interlock formations on the second coupling portion.

12. A fishing reel as claimed in claim 11 in which the second coupling portion comprises an annular plate having said interlock formations, coaxial with and opposed to the axially-deflectable component.

13. A fishing reel as claimed in claim 12 in which the second rotational element comprises a hub portion projecting axially from the centre of the annular plate, and the axially-deflectable component of the first rotational element makes a central hub engagement with said hub portion, the axially-deflectable component being axially bodily slidable at said central hub engagement.

14. A fishing reel as claimed in claim 13 in which the second rotational element comprises a cover portion joined to the hub portion and opposing the annular plate to retain the axially-deflectable component of the first rotational element between the cover portion and the annular plate.

15. A fishing reel as claimed in claim 1 in which at least one of said first and second coupling cam parts has an inclined sliding cam surface for said axial camming, terminating at a stop surface to terminate axial urge on the axially-deflectable component on reaching said position of engagement with the second coupling portion.

16. A fishing reel having
a spool rotatable in first and second opposite senses;
a braking arrangement for braking the rotation of the spool in the first sense of rotation thereof, and
a unidirectional coupling arrangement connected between the spool and braking arrangement;
said coupling arrangement comprising a first rotational element having a first coupling portion and first external connector means for coupling to one of said spool and said braking arrangement, and a second rotational element having a second coupling portion and second external connector means for coupling to the other of said spool and said braking arrangement, the first and second rotational elements being coaxial and their respective coupling portions being movable relative to one another between a first, coupled condition in which for said first sense of spool rotation the first and second coupling portions engage one another to rotate together and couple the rotating spool to the braking arrangement, and a second, uncoupled condition in which for the second sense of spool rotation the first and second coupling portions are relatively rotatable to uncouple the spool rotation from the braking arrangement;
the first rotational element comprising an entrainment ring and a discrete axially-deflectable rotor component, the entrainment ring having cooperating portions and the rotor component have circumferentially-space radial members which mesh with said cooperating portions with circumferential play whereby the entrainment ring and rotor component co-rotate with lost motion, the rotor component comprising integral interlock formations for coupling and being bodily axially deflectable relative to the entrainment ring and second coupling portion between a coupled position in which said interlock formations on the rotor component engage with complementary interlock formations on the second coupling portion for said first, coupled condition and an uncoupled position in which the interlock formations of the rotor component and second coupling portion are disengaged;
the cooperating portions of the entrainment ring making a coupling cam engagements with the radial members of the rotor component to urge axial deflection of the rotor component from the uncoupled position to the coupled position as said lost motion is taken up at the onset of spool rotation in said first sense.

17. A fishing reel as claimed in claim 16 in which each of the entrainment ring and the axially-deflectable rotor component is a one-piece plastics molding.

18. A fishing reel as claimed in claim 16 in which said interlock formations on the rotor component and second coupling portion comprise respective circumferential series of teeth.

19. A fishing reel as claimed in claim 16 in which the second rotational element comprises a pair of opposed end plates, at least one of said end plates providing said interlock formations inwardly directed thereon as said second coupling portion, and a central hub portion joining between the end plates, the rotor component of the first rotational element being journalled around said hub portion and the entrainment ring of the first rotational element being axially retained rotatably between said end plates.

20. A fishing reel as claimed in claim 19 in which said first external connector means comprises a circumferential series of teeth on the outer periphery of the entrainment ring and said second external connector means is provided by a non-circular keying opening in the central hub portion.

* * * * *